United States Patent
Ragan et al.

(10) Patent No.: US 9,065,310 B2
(45) Date of Patent: Jun. 23, 2015

(54) BELT CONVEYOR AND ELECTROMAGNETIC DRIVE

(71) Applicant: Laitram, L.L.C., Harahan, LA (US)

(72) Inventors: Bryant G. Ragan, Metairie, IA (US); Kevin W. Guernsey, Destin, FL (US); Wayne A. Pertuit, Jr., Westwego, LA (US)

(73) Assignee: Laitram, L.L.C., Harahan, LA (US)

( * ) Notice: Subject to any disclaimer, the term of this patent is extended or adjusted under 35 U.S.C. 154(b) by 74 days.

(21) Appl. No.: 14/048,092

(22) Filed: Oct. 8, 2013

(65) Prior Publication Data

US 2014/0110227 A1   Apr. 24, 2014

Related U.S. Application Data

(60) Provisional application No. 61/715,383, filed on Oct. 18, 2012.

(51) Int. Cl.

| | | |
|---|---|---|
| *B65G 23/08* | (2006.01) | |
| *B65G 47/10* | (2006.01) | |
| *H02K 7/14* | (2006.01) | |
| *H02K 7/10* | (2006.01) | |
| *B65G 23/00* | (2006.01) | |

(52) U.S. Cl.
CPC ...... *H02K 7/14* (2013.01); *B65G 23/08* (2013.01); *H02K 7/1008* (2013.01); *B65G 23/00* (2013.01)

(58) Field of Classification Search
USPC .......................... 198/788, 832, 833, 834, 835
See application file for complete search history.

(56) References Cited

U.S. PATENT DOCUMENTS

| | | | |
|---|---|---|---|
| 2,684,753 A | | 7/1954 | Kolbe et al. |
| 3,788,447 A | | 1/1974 | Stephanoff |
| 4,082,180 A | * | 4/1978 | Chung .......................... 198/835 |
| 4,613,805 A | | 9/1986 | Matsuo et al. |
| 4,781,286 A | | 11/1988 | Weaver |
| 4,832,183 A | | 5/1989 | Lapeyre |
| 5,054,601 A | | 10/1991 | Sjogren et al. |

(Continued)

FOREIGN PATENT DOCUMENTS

| | | |
|---|---|---|
| EP | 0425021 B1 | 6/1993 |
| GB | 1336956 A | 11/1973 |

(Continued)

OTHER PUBLICATIONS

International Search Report and Written Opinion of the International Searching Authority, PCT/US2013/063766, mailed Jan. 16, 2014, Korean Intellectual Property Office, Republic of Korea.

*Primary Examiner* — Douglas Hess
(74) *Attorney, Agent, or Firm* — James T. Cronvich

(57) ABSTRACT

A belt conveyor having an electromagnetic drive comprising a rotor and a stator sealed in separate nonmagnetic and non-conductive housings. The rotor is mounted to a drive shaft. A drive drum or drive sprockets supported on the shaft have peripheral drive surfaces that engage a conveyor belt. The rotor is coaxial with the peripheral drive surface—either sealed within the drum or sprockets or housed on the shaft axially spaced from the drive surface. The rotor may include conductive rotor bars or permanent magnets. The stator is spaced apart from the rotor across a narrow gap and produces a traveling magnetic flux wave across the gap that causes the rotor and the peripheral drive surface to rotate and drive the conveyor belt.

32 Claims, 11 Drawing Sheets

(56) References Cited

U.S. PATENT DOCUMENTS

| | | | |
|---|---|---|---|
| 5,172,803 A | 12/1992 | Lewin | |
| 5,180,344 A * | 1/1993 | Hall | 474/148 |
| 5,803,230 A * | 9/1998 | Canziani et al. | 198/370.06 |
| 6,279,728 B1 | 8/2001 | Jung et al. | |
| 6,528,908 B1 | 3/2003 | Lee | |
| 6,607,073 B2 | 8/2003 | Buchi et al. | |
| 6,710,505 B1 | 3/2004 | Barani et al. | |
| 6,814,216 B2 | 11/2004 | Veit et al. | |
| 6,938,750 B2 * | 9/2005 | Miller et al. | 198/370.06 |
| 7,112,901 B1 * | 9/2006 | Soitu | 310/67 R |
| 7,299,915 B2 * | 11/2007 | El-Ibiary | 198/788 |
| 7,362,016 B2 * | 4/2008 | Cheng | 310/52 |
| 7,597,190 B2 | 10/2009 | Lee | |
| 7,618,352 B1 * | 11/2009 | Wei | 482/54 |
| 8,109,383 B1 | 2/2012 | Suderman et al. | |
| 8,413,793 B2 | 4/2013 | Bruett | |
| 2004/0134752 A1 | 7/2004 | Miller et al. | |
| 2006/0011093 A1 | 1/2006 | Jensen et al. | |
| 2008/0011586 A1 | 1/2008 | Kanaris | |
| 2010/0018842 A1 | 1/2010 | Gundlach | |
| 2010/0230245 A1 | 9/2010 | Ragan et al. | |
| 2012/0032084 A1 | 2/2012 | Sapp et al. | |

FOREIGN PATENT DOCUMENTS

| | | |
|---|---|---|
| GB | 1419358 A | 12/1975 |
| JP | H07-8331 U | 2/1995 |
| JP | 10029715 A | 2/1998 |
| JP | 10231009 A | 9/1998 |
| WO | 9301646 A1 | 1/1993 |
| WO | 0059810 A2 | 10/2000 |
| WO | 2010121303 A1 | 10/2010 |
| WO | 2012004770 A1 | 1/2012 |
| WO | 2012075976 A1 | 6/2012 |

* cited by examiner

BELT CONVEYOR AND ELECTROMAGNETIC DRIVE

BACKGROUND

The invention relates generally to power-driven conveyors and more particularly to belt conveyors driven by separately housed stators and rotors.

Conveyor belts are conventionally driven by sprockets, drums, or pulleys mounted on a drive shaft rotated by an electric motor via a reduction gear, a sprocket-chain system, or a belt-pulley system. These standard components present many hiding places for debris and other contaminants. In the food processing industry, the harboring of contaminants and bacteria is problematic. Furthermore, reduction gears wear out and require lubrication.

SUMMARY

A conveyor-belt drive embodying features of the invention comprises a rotor mounted to a drive shaft having an axis. A drive element having a peripheral drive surface is supported by the drive shaft. The peripheral drive surface, which is adapted to engage a conveyor belt, is coaxial with the rotor. A stator is separated from the rotor across the gap that extends partway around the rotor. The stator produces a traveling magnetic flux wave across the gap that interacts with the rotor and causes it to rotate the drive shaft and the peripheral drive surface to drive an engaged conveyor belt.

In another aspect, a conveyor embodying features of the invention comprises a drive surface rotated by a drive shaft about its axis. A conveyor belt is engaged by the drive surface to advance the belt. A rotor, sealed within a rotor housing, is coupled to the drive shaft. A stator, spaced apart from the rotor across a gap, is sealed within a stator housing. Both the rotor housing and the stator housing are made of nonmagnetic and nonconductive materials. The stator produces a traveling magnetic flux wave across the gap that interacts with the rotor to cause the rotor to rotate the drive shaft and the drive surface to advance the conveyor belt.

BRIEF DESCRIPTION OF THE DRAWINGS

These aspects and features of the invention, as well as its advantages, are described in more detail in the following description, appended claims, and accompanying drawings, in which:

DETAILED DESCRIPTION

Figure 1A:
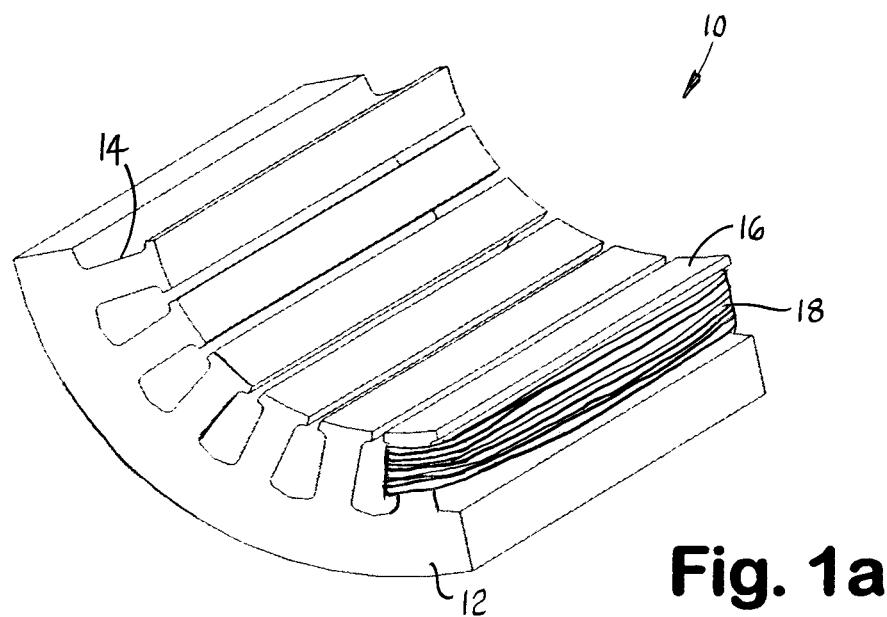
FIG. 1a is an isometric view of a stator usable in a conveyor-belt drive embodying features of the invention.

A curved linear-induction stator usable in a belt-conveyor drive embodying features of the invention is shown in FIG. 1a. The stator 10 has a core 12 which may be made up of a solid metal piece or metal laminations. Poles 14 extend radially from the core to outer pole faces 16 that define the arc of a circle. Coils 18 wrapped around the poles 14 form electromagnets that are energized by an alternating current to produce a magnetic flux wave through the pole faces 16. The magnetic flux wave travels from pole to pole in one direction or the other. (The coil on only one of the poles is shown in FIG. 1a for clarity.)

Unlike the stators of most motors, the stator 10 in FIG. 1a does not make a complete 360° circle. Instead, it extends only over an arc of about 90°. In fact, the stator is more like a curved linear-induction stator than a conventional motor stator.

Figure 1B:
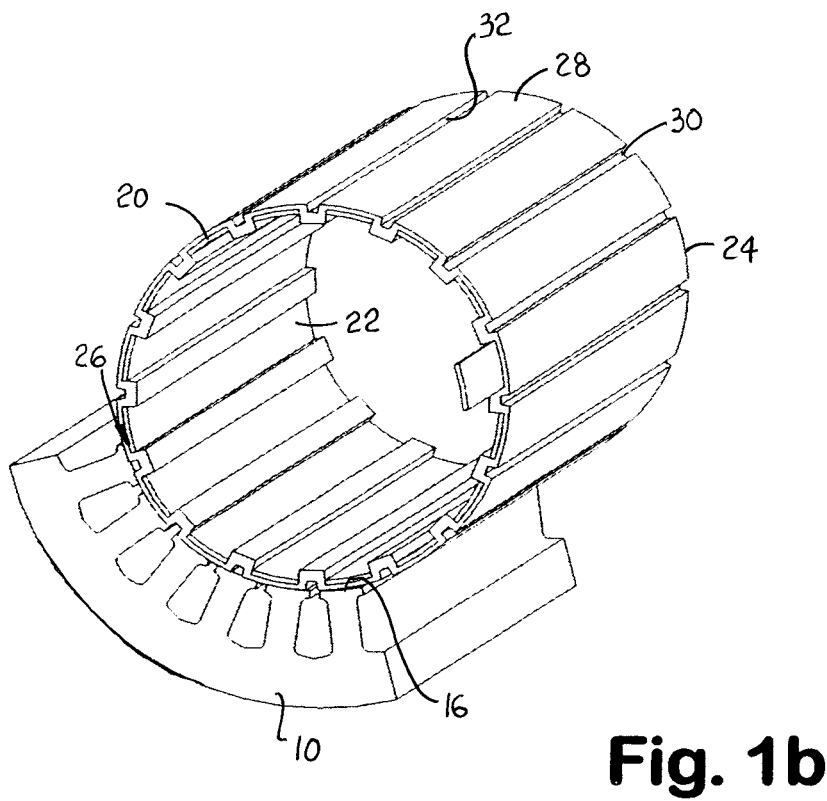
FIG. 1b is an isometric view of one version of a drive system using a stator as in FIG. 1a and a conductive-bar rotor in a drive drum.

FIG. 1b shows the stator 10 of FIG. 1a associated with a rotor 20 consisting of a plurality of rotor bars 22 embedded in the interior of a drive element, such as a drum 24, at regularly spaced circumferential intervals. The rotor bars 22 are separated from the stator pole faces 16 by a gap 26 that extends partway around the rotor. The magnetic flux from the stator poles crosses the gap and induces currents in the electrically conductive rotor bars that produce a magnetic field that interacts with the stator field. The resultant force causes the motor to rotate and chase the stator's traveling magnetic field. The drum 24 has a smooth cylindrical outer peripheral surface 28. Axial slots 30 in the outer surface at a regular pitch form drive faces 32 that can drive drive-receiving surfaces on a conveyor belt. Or the outer drive surface can be smooth, uninterrupted by slots, for frictionally engaging and driving a tensioned flat belt.

Figure 1C:
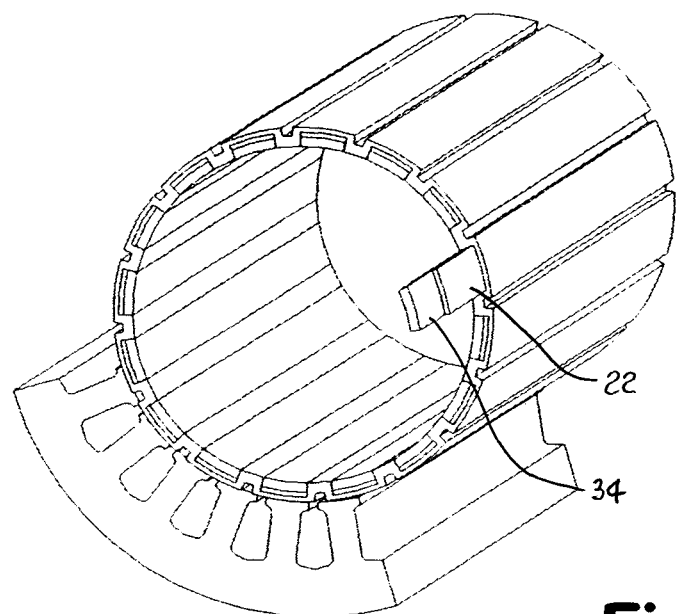
FIG. 1c is an isometric view of an alternative version of the drive system of FIG. 1b with steel reaction bars backing the rotor bars in the drive drum.
Figure 1D:
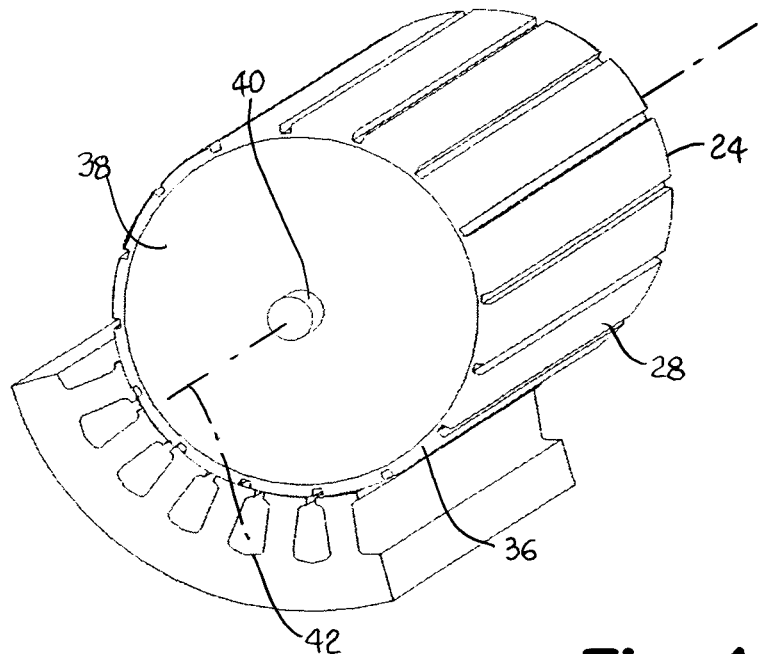
FIG. 1d is an isometric view of the drive system of FIG. 1b sealed with end caps.

In FIG. 1c the rotor bars 22, which are preferably made of aluminum or another electrically conductive material, are backed by torque reaction bars 34, which may be made of a ferrous material, such as steel, to increase the flux density and the drive force. (As used throughout the description and claims, the terms "conductive" and "nonconductive" refer to electrical conductivity.) As shown in FIG. 1d, the rotor is sealed within a rotor housing 36 formed by the peripheral drive surface 28 and end caps 38 at each end of the housing. The rotor housing is mounted on a drive shaft 40 extending outward from the end caps. The rotor and the peripheral drive surface are coaxial with each other and with the axis 42 of the drive shaft. The peripheral drive surface is made of a nonmagnetic and nonconductive material, such as plastic, so as not to interfere with the traveling magnetic field or to have currents induced in the drive surface.

Figure 2:
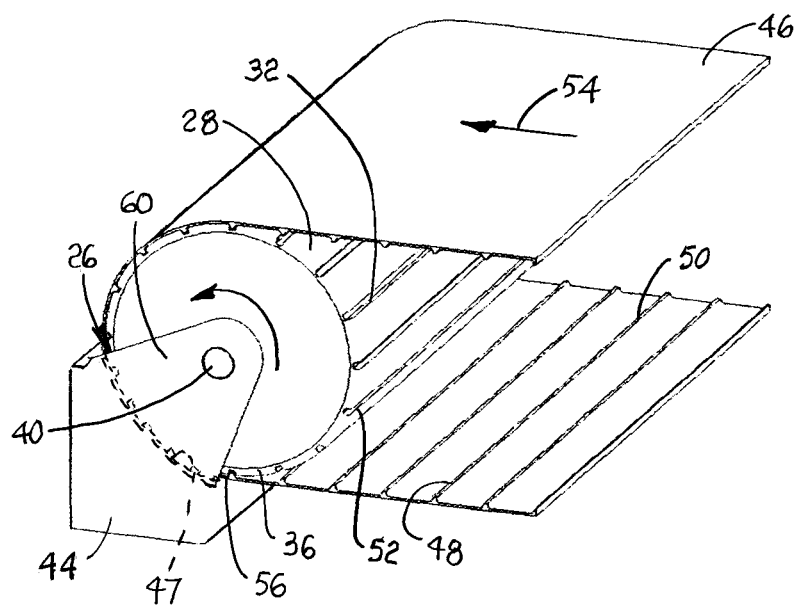
FIG. 2 is an isometric view of a conveyor system using a stator as in FIG. 1a sealed in a housing under the drum and pressing against the outer surface of a conveyor belt.

FIG. 2 shows a belt drive with a rotor sealed within a rotor housing 36 as in FIG. 1d. The stator is sealed within a nonmagnetic and nonconductive stator housing 44. The stator housing has generally smooth outer surfaces that are easy to clean. A conveyor belt 46 has drive faces 48 along one side of regularly spaced teeth 50 formed on the inner side of the belt. The teeth are received in slots 52 in the peripheral drive surface 28 of the drum 36. The drive faces 32 bounding the slots engage the drive faces 48 to advance the belt in the direction of belt travel 54. The conveyor belt 46 passes through the gap 26 between the stator housing 44 and the rotor housing 36. The stator housing 44 presents a concave bearing surface 47 against the conveyor belt to ensure that a drive face 48 of the belt is engaged by a drive face 32 of the drum 36 at a position just ahead of the exit point 56 of the belt from the drum. In this way, the stator housing also serves as a position limiter for a low-tension, positively driven conveyor belt.

Figure 3:
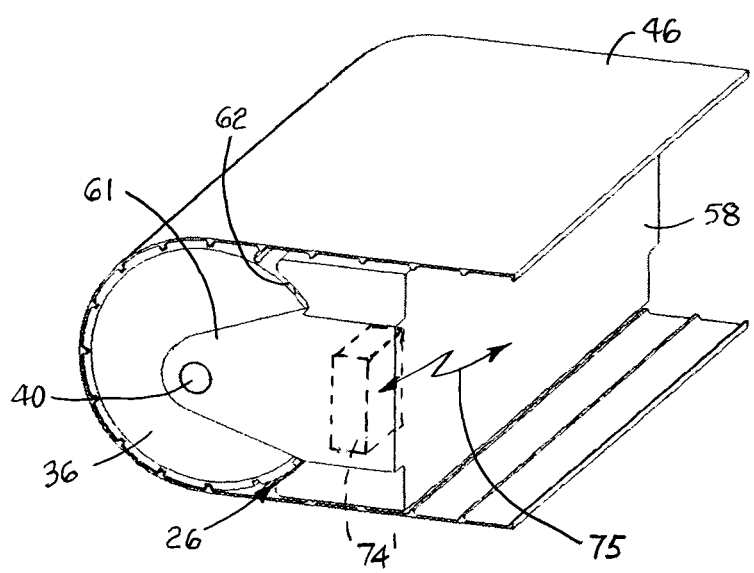
FIG. 3 is an isometric view of a conveyor system as in FIG. 2, but with the stator sealed in a housing behind the drum.
Figure 4:
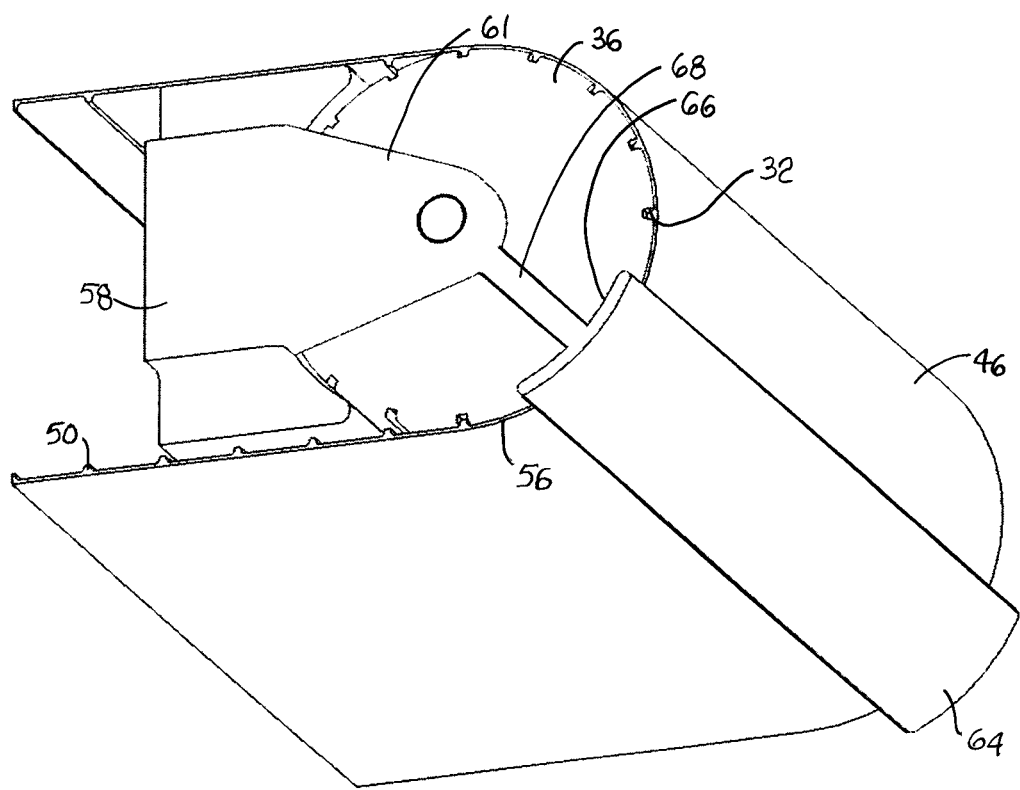
FIG. 4 is an isometric view of a conveyor system as in FIG. 3 with a dedicated position limiter.

FIG. 3 shows a stator housing 58 mounted behind the rotor drum 36. In this configuration, unlike that of FIG. 2, the belt 46 does not pass through the gap 26. For this reason, the gap can be narrower, which improves the coupling of magnetic flux from the stator to the rotor. Furthermore, the stator housing 58 could be formed as an extension of the conveyor carryway. The stator housings 44, 58 in FIGS. 2 and 3 each have arms 60, 61 that attach to the drive shaft 40 to maintain a fixed gap width between rotor and stator. Because the stator housing 58 in FIG. 3 does not contact the belt 46, its concave face 62 cannot serve as a position limiter. A modified version of the stator housing in FIG. 3 is shown in FIG. 4 with a position limiter 64 attached to distal ends of the arms 61 of the stator housing 58. The concave inner surface 66 of the position limiter bears against the belt 46 and maintains the belt tooth 50 engaged with the drive face 32 of the drum 36 just ahead of the exit point 56 of the belt from the drum. The position limiter 64 is connected to the arm 61 by legs 68.

Figure 5:
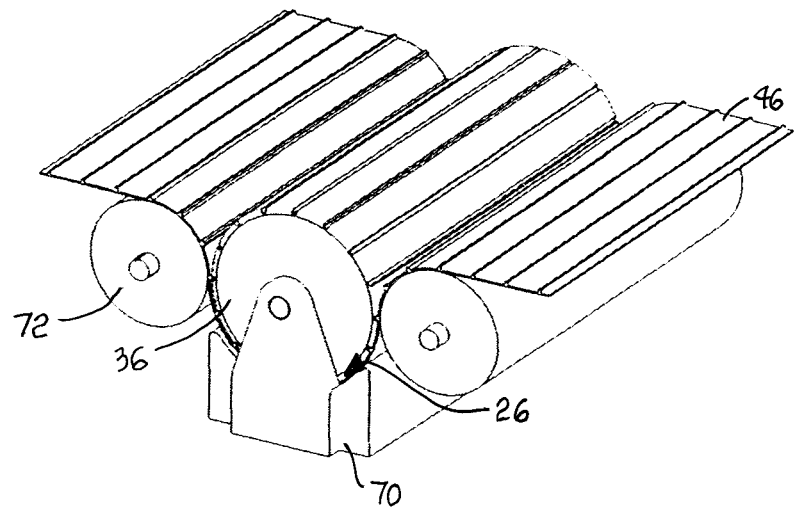
FIG. 5 is an isometric view of a center-driven conveyor with a stator as in FIG. 1a mounted in a housing below the belt returnway.
Figure 6:
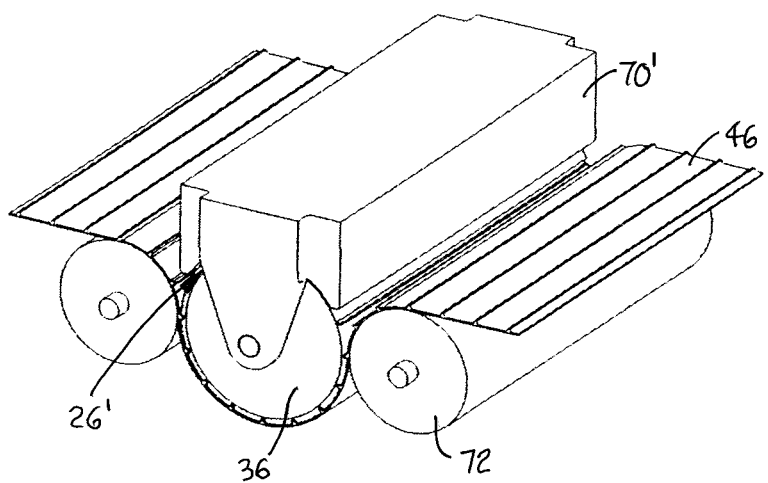
FIG. 6 is an isometric view of a conveyor as in FIG. 5 with the stator housing disposed above the returnway.

FIGS. 5 and 6 show conveyor belts 46 driven by a drive unit in the returnway, rather than at an end of the carryway as in FIGS. 2-4. In FIG. 5 the stator housing 70 is mounted below the drum 36 with the belt passing through the stator-rotor gap 26. In FIG. 6 the stator housing 70' is mounted above the drum 36, and the belt 46 does not advance through the narrower gap 26'. The stator housing 70' can be integral to the carryway. Snubber rollers 72 before the entrance and after the exit to the drum increase the circumferential extent of belt wrap around the drum.

Figure 7:
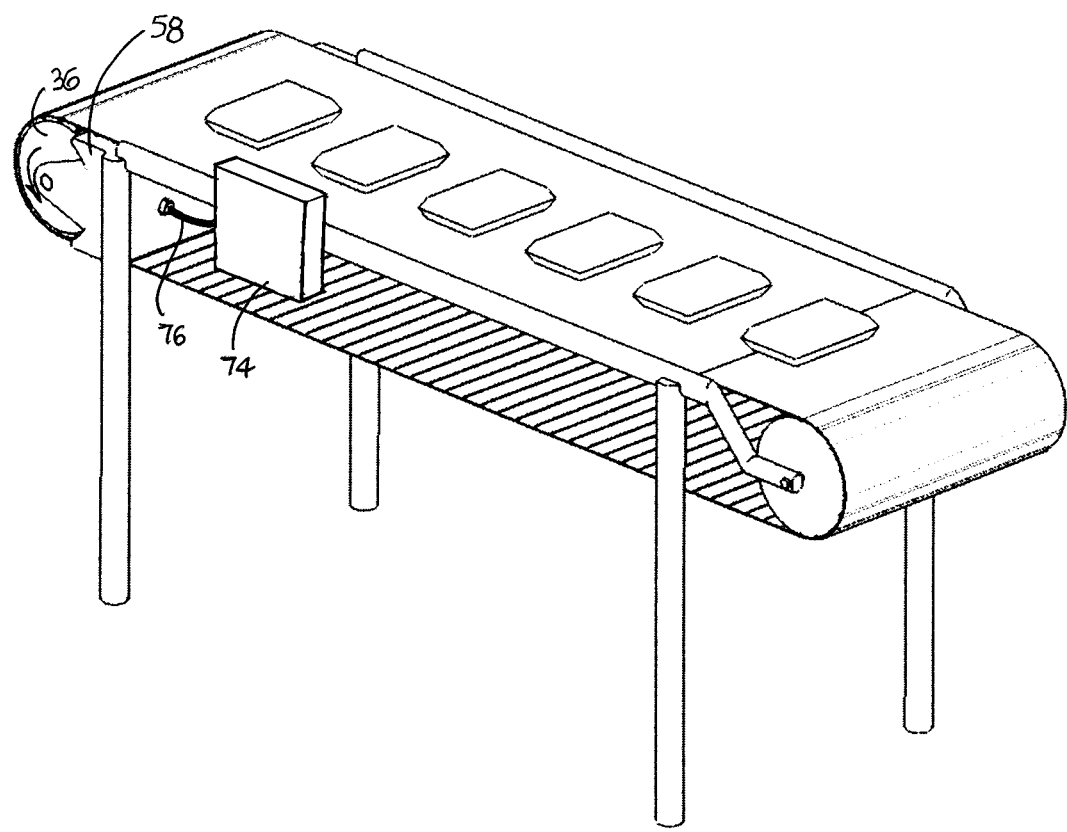
FIG. 7 is an isometric view of a conveyor with a drive system as in FIG. 3.

FIG. 7 shows a complete conveyor system, in which a stator housing 58 as in FIG. 3 is mounted at an end of the carryway. A motor controller 74 sends motor control signals over signal lines 76 to the stator in the housing 58 to control the magnetic flux wave, the rotation of the rotor and the drum 36, and the belt speed and direction. The motor controller 74' could alternatively be mounted within the stator housing 58, as shown in FIG. 3, requiring only the connection of ac line power. The motor controller could be operated and monitored remotely via a wireless RF link 75 or other remote control means. This would further improve the hygienic qualities of the conveyor.

Figure 8A:
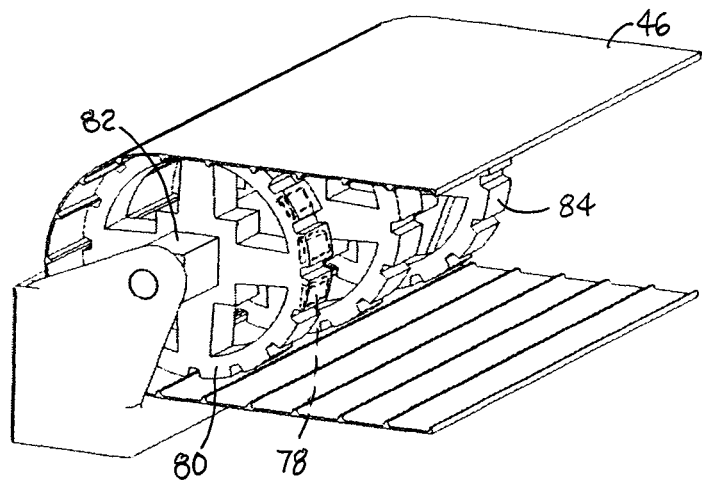
FIG. 8a is an isometric view of a drive system as in FIG. 2, but with sprockets, instead of a drum, housing the rotor.
Figure 8B:
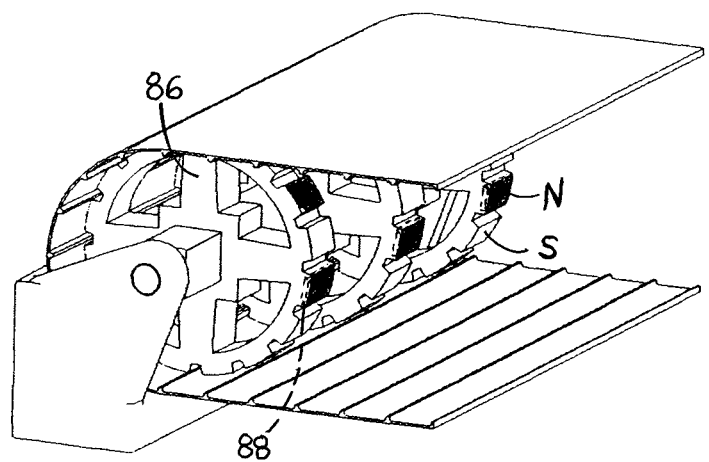
FIG. 8b is an isometric view of a drive system as in FIG. 8a with permanent magnets in the rotor.
Figure 8C:
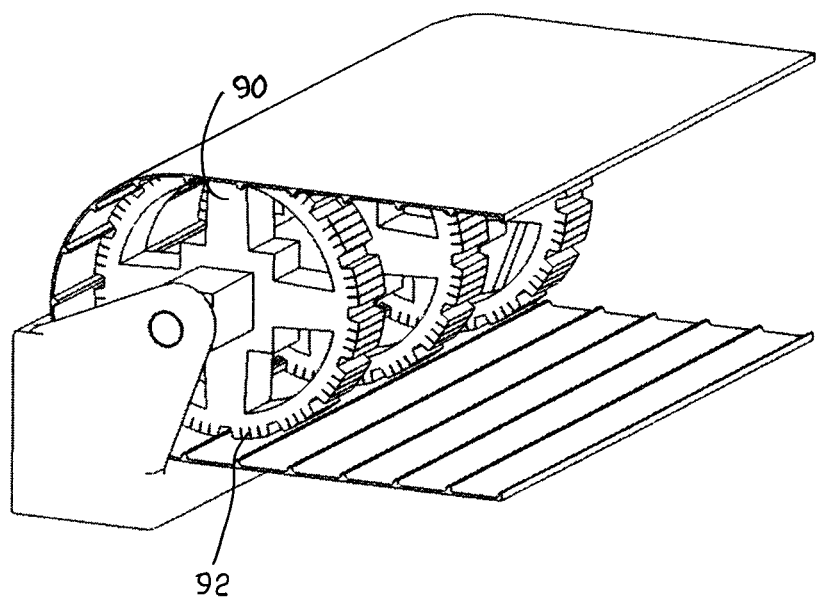
FIG. 8c is an isometric view of a drive system as in FIG. 8b in which the permanent magnets are arranged in Halbach arrays.

Instead of using a drum as the driving element and rotor housing, the electromagnetic drives in FIGS. 8a-8c use narrower sprocket wheels to house the rotors. In FIG. 8a the rotor comprises a series of electrically conductive plates 78 embedded in nonmagnetic and nonconductive sprockets 80 mounted on a drive shaft 82. The outer peripheral surfaces 84 of the sprockets engage and drive the conveyor belt 46. Like the conductive rotor bars in FIG. 1c, the conductive plates 78 can be backed by steel plates to reduce reluctance in the magnetic circuit between the stator and rotor. In the rotor configuration of FIG. 8a, the electromagnetic drive, like the drives in FIGS. 1b and 1c, operates as an ac induction motor.

The sprockets 86 in FIG. 8b contain permanent magnets 88 alternating circumferentially in polarity between outward north poles N and south poles S. In the sprockets 90 in FIG. 8c, the magnets are arranged as Halbach arrays 92 of alternating polarity to concentrate the magnetic flux in the direction of the stator poles. The permanent magnet rotors of FIGS. 8b and 8c and the stators can be operated as permanent-magnet ac motors or as brushless dc motors, as could drum versions that contain permanent magnets in the rotors.

Figure 9A:
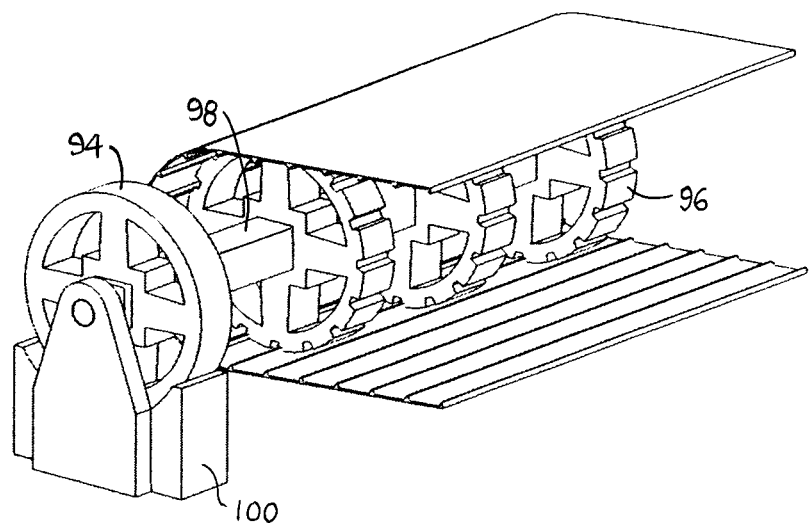
FIG. 9a is an isometric view of a sprocket-drive system as in FIG. 8a in which the rotor and stator are axially spaced from the drive sprockets.
Figure 9B:
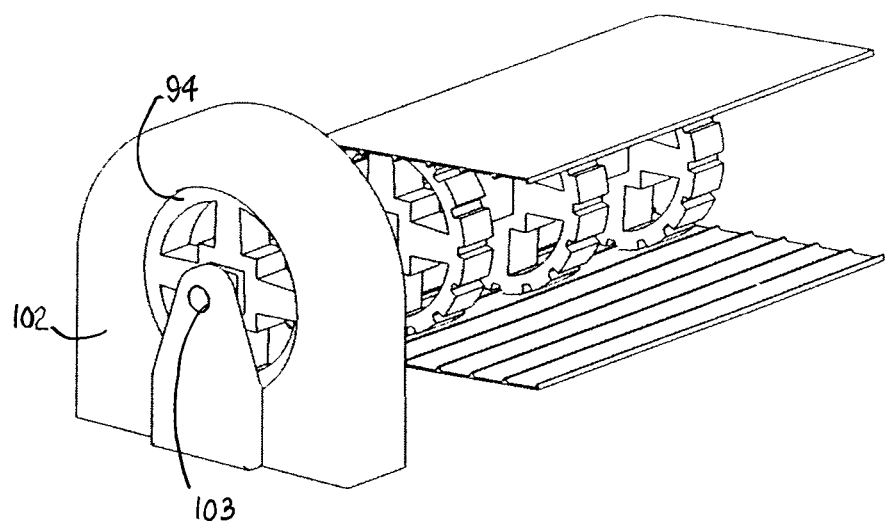
FIG. 9b is an isometric view of a sprocket-driven system as in FIG. 9a with a stator completely encircling the rotor.

In FIG. 9a the rotor is sealed in a rotor housing 94 in the form of a wheel axially remote from standard sprockets 96 mounted on a drive shaft 98. The sprockets 96 have peripheral drive surfaces that engage the conveyor belt. The stator is sealed in a stator housing 100 that extends partway around the circumference of the embedded rotor. In FIG. 9b the stator in a stator housing 102 completely encircles the rotor wheel 94 to form a conventional motor, but with the rotor and stator sealed in separate housings. In both these examples the rotor could include electrically conductive plates like those in the sprockets of FIG. 8a or permanent magnets like those in FIGS. 8b and 8c. The motor formed by the rotor and stator has a single bearing 103 and requires no shaft coupler or reduction gear. And, as shown in FIG. 9e, the rotor housing 94 can be slid along the drive shaft 98 away from the stator housing 102 for easy cleaning of both.

Figure 9C:
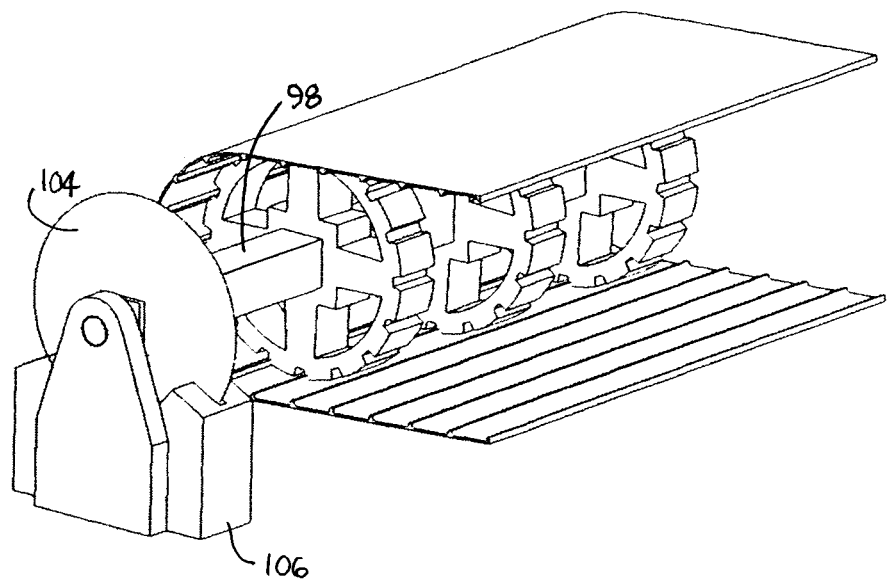
FIG. 9c is an isometric view of a sprocket-driven system as in FIG. 9a in which the rotor is a conductive disc.

In FIG. 9c the electromagnetic drive is axially remote from the drive elements as in FIGS. 9a and 9b, but the rotor is a sealed conductive disc 104 mounted on the drive shaft 98. The stator is shown as a double-sided stator sealed in a stator housing 106 that extends partway around the periphery of the disc. The double-sided stator improves the coupling of magnetic flux to the disc rotor. But a single-sided stator could be used to rotate the disc 104, as shown in FIG. 9f, in which a minimal stator housing 107 is used for easy cleaning.

Figure 9D:
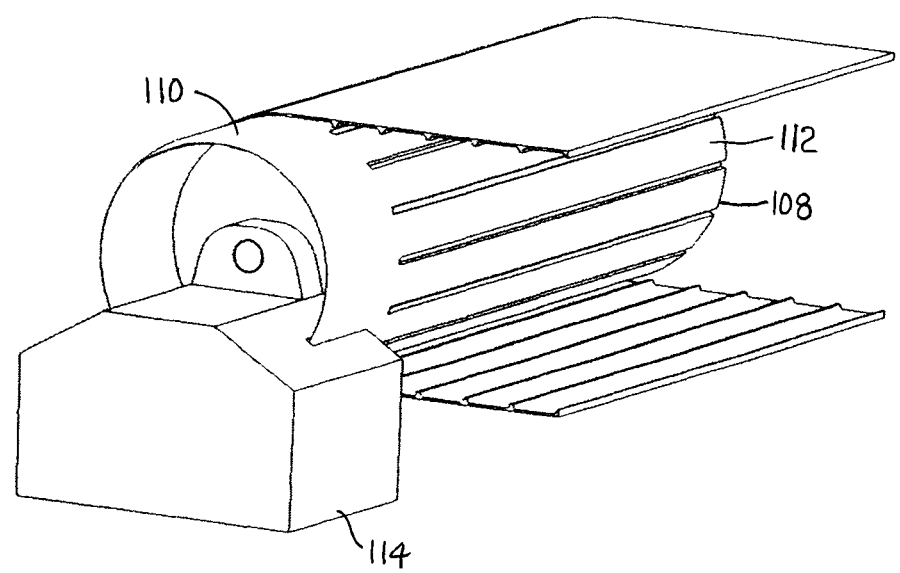
FIG. 9d is an isometric view of a sprocket-driven system as in FIG. 9a in which the rotor is a conductive cylinder driven by a two-sided stator.
Figure 9E:
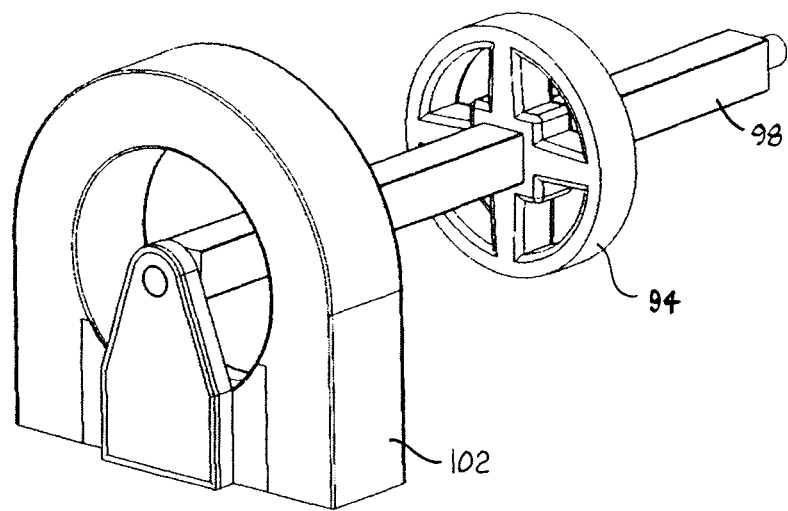
FIG. 9e is an isometric view of the stator end of the sprocket-driven system of FIG. 9b with the rotor housing removed from the housing for cleaning.
Figure 9F:
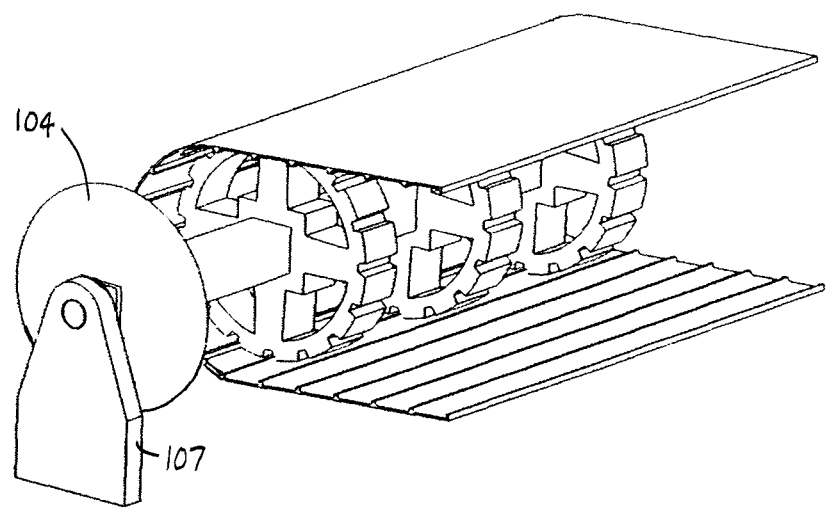
FIG. 9f is an isometric view of a sprocket-driven system as in FIG. 9c with a conductive-disc rotor and in which a one-sided stator is housed in a minimal housing.

In FIG. 9d a rotor drum 108 has an extension 110 that extends axially outward of its peripheral drive surface 112. A conductive cylinder in the extension serves as a rotor that is rotated by the magnetic flux wave produced by a two-sided stator sealed in a stator housing 114 that extends partway around the rotor. A one-sided rotor could be used as well.

Although the invention has been described with reference to a few exemplary versions, other versions are possible. For example, the drive systems shown with sprockets could be used with drums, and vice versa. As another example, the rotor need not be mounted on the drive shaft and can be coupled to the drive shaft other than through a direct connection. For example, the rotor can be coupled to the drive shaft via a reduction gear, a sprocket-chain system, or a belt-pulley system. And, although all the drive systems described in detail have constant-width stator-rotor gaps, the gap width does not have to be constant. For example, a curved rotor could be used with a linear stator tangent to the rotor or with a curved liner stator having a much greater radius of curvature than the rotor and a diverging air gap. So, as these examples suggest, the claims are not meant to be limited to the versions described in detail.

What is claimed is:

1. A drive for a conveyor belt, comprising:
a drive shaft having an axis;
a rotor mounted to the drive shaft;
a drive element supported by the drive shaft and having a peripheral drive surface coaxial with the rotor, the peripheral drive surface adapted to engage a conveyor belt;
a stator separated from the rotor across a gap extending partway around the rotor and producing a traveling magnetic flux wave across the gap that interacts with the rotor to cause the rotor to rotate the drive shaft and the peripheral drive surface to drive an engaged conveyor belt.

2. A drive as in claim 1 wherein the rotor is enclosed within the drive element.

3. A drive as in claim 1 wherein the peripheral drive surface rotates through the gap between the rotor and the stator.

4. A drive as in claim 1 wherein the gap between the stator and the rotor is great enough to admit a conveyor belt engaged with the peripheral drive surface.

5. A drive as in claim 1 wherein the rotor includes circumferentially spaced electrically conductive bars extending axially along the drive element interior to the peripheral drive surface.

6. A drive as in claim 5 wherein the electrically conductive bars are backed by steel reaction bars to increase drive torque.

7. A drive as in claim 1 wherein the peripheral drive surface is smooth.

8. A drive as in claim 1 wherein the peripheral drive surface has drive faces circumferentially spaced at a regular pitch.

9. A drive as in claim 1 wherein the peripheral drive surface is nonmagnetic and nonconductive.

10. A drive as in claim 1 wherein the rotor is sealed within the drive element.

11. A drive as in claim 1 wherein the drive element is made of plastic molded around the rotor.

12. A drive as in claim 1 further including a nonmagnetic and nonconductive housing enclosing the stator.

13. A drive as in claim 1 wherein the rotor includes a plurality of circumferentially spaced magnets.

14. A drive as in claim 13 wherein the poles of the magnets alternate in polarity circumferentially around the rotor.

15. A drive as in claim 13 wherein each of the magnets is a Halbach array.

16. A drive as in claim 1 wherein the rotor is an electrically conductive aluminum cylinder interior to the peripheral drive surface.

17. A drive as in claim 1 further comprising a plurality of drive elements spaced apart axially and supported by the drive shaft.

18. A drive as in claim 1 wherein the rotor is axially spaced from the drive element.

19. A drive as in claim 18 wherein the rotor is an electrically conductive disc.

20. A drive as in claim 18 further comprising a wheel mounted on the drive shaft axially spaced from the drive element and housing the rotor.

21. A drive as in claim 1 further comprising a nonmagnetic and nonconductive stator housing enclosing the stator and wherein the drive element is nonmagnetic and nonconductive and encloses the rotor.

22. A drive as in claim 1 wherein the stator includes a plurality of circumferentially spaced poles having outer pole faces arranged along an arc of a circle.

23. A drive as in claim 1 further comprising a motor controller sending signals to the stator to control the traveling magnetic flux wave and the rotation of the rotor.

24. A conveyor comprising:
a drive shaft having an axis;
a drive surface rotated by the drive shaft about the axis;
a conveyor belt engaged by the drive surface to advance the belt;
a rotor housing made of a nonmagnetic and nonconductive material;
a rotor sealed within the rotor housing and coupled to the drive shaft;
a stator housing made of a nonmagnetic and nonconductive material;
a stator spaced apart from the rotor across a gap and sealed within the stator housing, wherein the stator produces a traveling magnetic flux wave across the gap that interacts with the rotor to cause the rotor to rotate the drive shaft and the drive surface to advance the conveyor belt.

25. A conveyor as in claim 24 wherein the drive surface is a cylindrical outer surface of the rotor housing.

26. A conveyor as in claim 24 wherein the conveyor belt advances through the gap between the rotor and the stator.

27. A conveyor as in claim 24 wherein the rotor includes circumferentially spaced electrically conductive bars extending axially along the rotor housing.

28. A conveyor as in claim 24 wherein the drive surface has drive faces circumferentially spaced at a regular pitch and the conveyor belt has drive faces engaged by the drive faces on the drive surface, wherein the stator housing has a bearing surface bounding the gap to force a drive face of the conveyor belt into engagement with a drive face on the drive surface just ahead of the conveyor belt's exit from the drive surface.

29. A conveyor as in claim 24 wherein the drive surface is formed on a plurality of sprockets mounted at axially spaced positions on the drive shaft.

30. A conveyor as in claim 24 wherein the conveyor belt does not engage the drive surface in the gap between the stator and the rotor and the conveyor further comprises a position limiter having a bearing surface bearing against the conveyor belt to force it toward the drive surface.

31. A conveyor as in claim 24 further comprising a motor controller sending signals to the stator to control the magnetic flux wave and the rotation of the rotor.

32. A conveyor as in claim 31 wherein the motor controller is enclosed within the stator housing.

* * * * *